United States Patent
York et al.

(10) Patent No.: US 8,961,321 B2
(45) Date of Patent: Feb. 24, 2015

(54) MANAGEMENT OF GAMING DATA

(75) Inventors: Jason York, Bellevue, WA (US); Richard T. Martinez, Carnation, WA (US); Joshua Whitney Samuels Atkins, Surrey (GB); Peter Douglas Molyneux, Surrey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 822 days.

(21) Appl. No.: 12/482,695

(22) Filed: Jun. 11, 2009

(65) Prior Publication Data

US 2010/0210364 A1 Aug. 19, 2010

Related U.S. Application Data

(60) Provisional application No. 61/152,598, filed on Feb. 13, 2009.

(51) Int. Cl.
*A63F 9/24* (2006.01)
*A63F 13/00* (2014.01)
*G06F 17/00* (2006.01)
*G06F 19/00* (2011.01)
*A63F 13/30* (2014.01)
*A63F 13/40* (2014.01)

(52) U.S. Cl.
CPC .............. *A63F 13/10* (2013.01); *A63F 13/12* (2013.01); *A63F 2300/5546* (2013.01)
USPC .............................................. 463/43; 463/42

(58) Field of Classification Search
USPC ...................................................... 463/42, 43
See application file for complete search history.

(56) References Cited

U.S. PATENT DOCUMENTS

| | | | |
|---|---|---|---|
| 6,338,680 B1 * | 1/2002 | Connors | 463/43 |
| 6,820,265 B1 | 11/2004 | Stamper et al. | |
| 7,097,559 B2 | 8/2006 | Okita et al. | |
| 7,156,733 B2 | 1/2007 | Chiang et al. | |
| 7,357,719 B2 | 4/2008 | Yamato et al. | |
| 2004/0106456 A1 | 6/2004 | Yamada et al. | |
| 2004/0180718 A1 | 9/2004 | Uchida et al. | |
| 2006/0028475 A1 * | 2/2006 | Tobias | 345/473 |
| 2007/0111802 A1 * | 5/2007 | Ishihara et al. | 463/43 |
| 2007/0155486 A1 | 7/2007 | Futa et al. | |

(Continued)

OTHER PUBLICATIONS

Baldur's Gate 2, Sep. 24, 2000, Black Isle Studios, manual.*

(Continued)

*Primary Examiner* — Kevin Y Kim
(74) *Attorney, Agent, or Firm* — Aaron Chatterjee; Kate Drakos; Micky Minhas

(57) ABSTRACT

Systems and methods for managing gaming data are provided. The system may include at least one computing device coupled to a gaming service. The computing device may be configured to execute a gaming engine configured to generate a first character profile based on a user's interaction within a gaming environment included in a first gaming application. Additionally, the computing device may be configured to execute an update module configured to merge the first character profile with a second character profile generated via a second gaming application based on a user's interaction within a second gaming environment and generate a merged character profile, the merged character profile including content from the first and second character profiles, wherein the content include statistical data, character trait data, and/or item data from the first and second character profiles.

20 Claims, 5 Drawing Sheets

(56) References Cited

U.S. PATENT DOCUMENTS

2007/0173332 A1 7/2007 Liu et al.
2008/0045283 A1 2/2008 Stamper et al.

OTHER PUBLICATIONS

Maxis, "The Sims 2," EA Games, Sep. 14, 2004.*
Maxis, "The Sims 2: Nightlife," EA Games, Sep. 13, 2005.*
IGN, "The Sims 2 Nightlife" review, Sep. 12, 2005.*
Relmstein, "Shared Character Advancement in WoW and War", Retrieved at<<http://relmstein.blogspot.com/2008/07/shared-character-advancement-in-wow-and.html, Feb. 13, 2009, pp. 15.
Heiger, "Rewind Review: Penny Arcade Episode 1 and Episode 2 (XBLA)", XBLA Fans, Sep. 6, 2011, 3 pages.

* cited by examiner

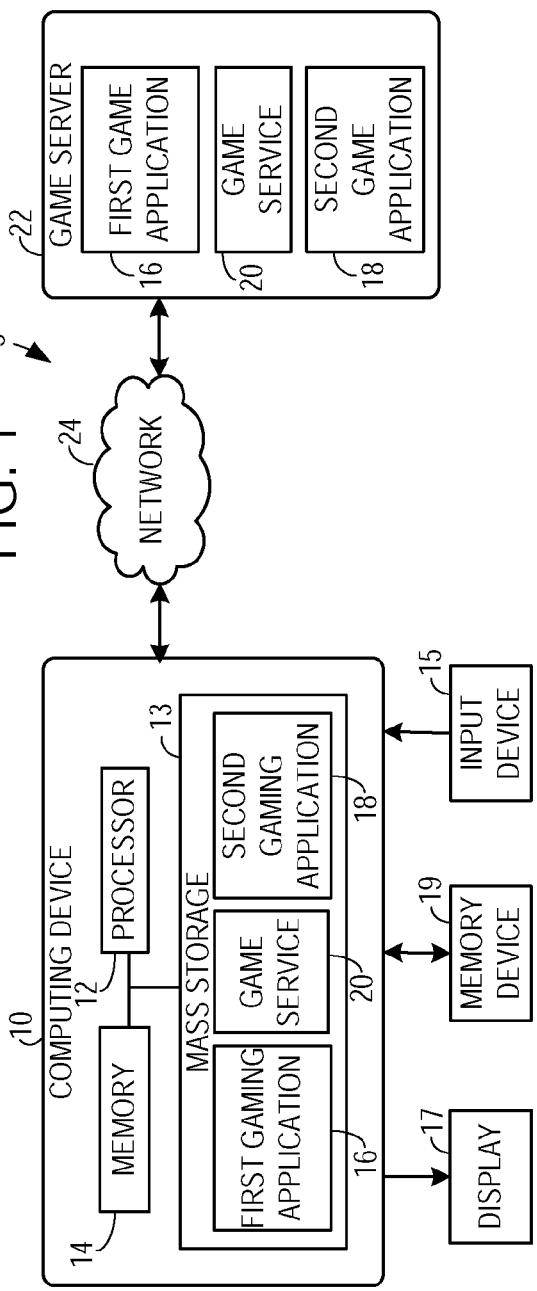
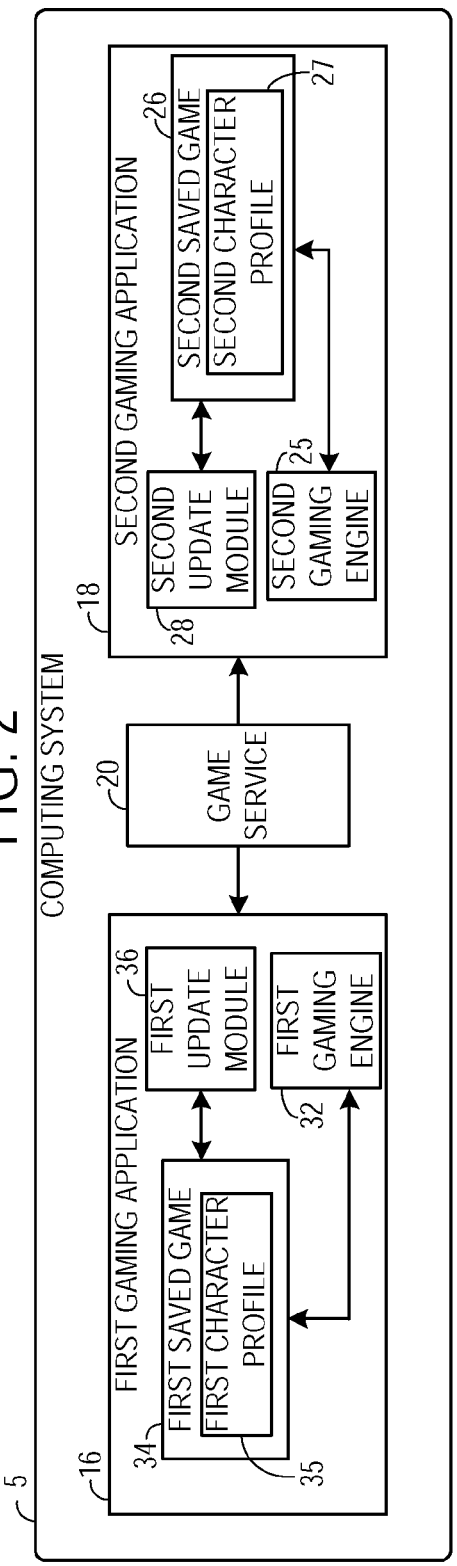

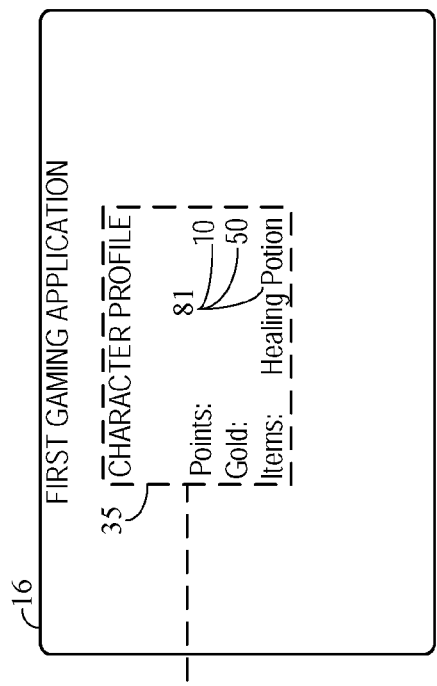
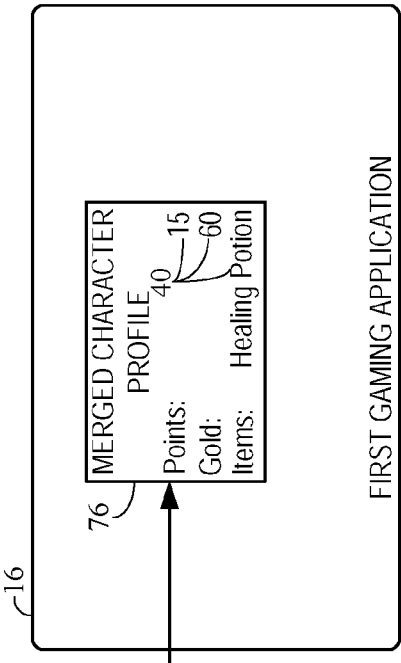
FIG. 4
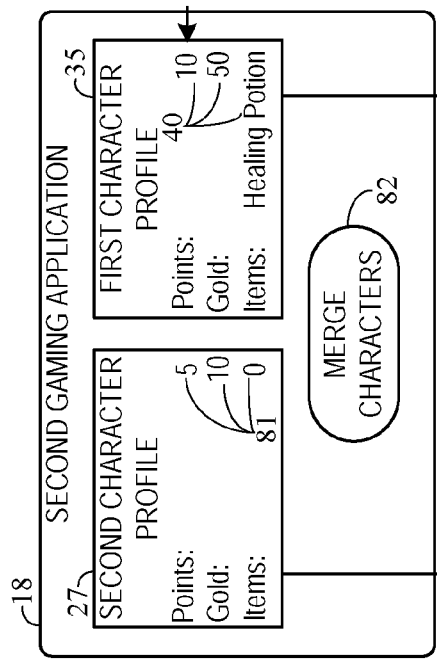
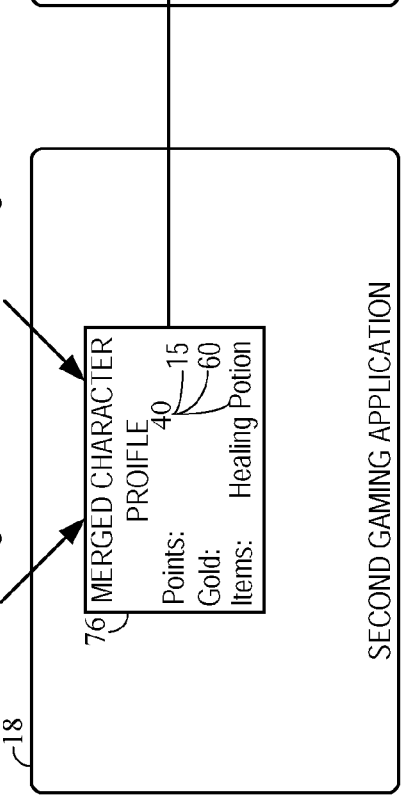
FIG. 5

MANAGEMENT OF GAMING DATA

CROSS-REFERENCE TO RELATED APPLICATIONS

This application claims priority to U.S. Provisional Patent Application No. 61/152,598, filed Feb. 13, 2009 entitled "Sharing Gaming Data Between Gaming Applications" the entire contents of which are hereby incorporated herein by reference for all purposes.

BACKGROUND

Computer games continue to increase in popularity due in part to technological advancements, such as high speed network connections and advanced microprocessors. These technological advancements enable development of rich gaming environments, increased user interaction, and state of the art peer to peer game play. Thus, gamers can more fully interact within gaming environments. One drawback of such computer games is that despite the significant amounts of time and effort that a user might devote to developing a character in a first game, when that game is completed the user typically abandons the character, and starts anew developing a character in a second game. This is particularly frustrating for users when moving between games of the same genre, since developing a character in the second game may involve repeating mundane tasks that the user has already mastered in a different game, in order to develop a character sufficiently to provide enjoyable game play for the user. As a result, users may tire of the second game, or not commence playing the second game at all.

SUMMARY

Systems and methods for managing gaming data are provided. The system may include at least one computing device coupled to a gaming service. The computing device may be configured to execute a gaming engine configured to generate a first character profile based on a user's interaction within a gaming environment included in a first gaming application. Additionally, the computing device may be configured to execute an update module configured to merge the first character profile with a second character profile generated via a second gaming application based on a user's interaction within a second gaming environment and generate a merged character profile, the merged character profile including content from the first and second character profiles, wherein the content includes statistical data, character trait data, and/or item data from the first and second character profiles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a schematic view that shows an embodiment of a computing system for merging gaming data between gaming applications, including a computing device in communication with a game server over a network.

FIG. 2 is a schematic view that illustrates internal details of a first gaming application and a second gaming application of the computing system of FIG. 1.

FIGS. 4-5 are schematic views that show an exemplary depiction of a graphical user interface allowing a user to merge gaming data from two or more saved games.

DETAILED DESCRIPTION

Figure 3:
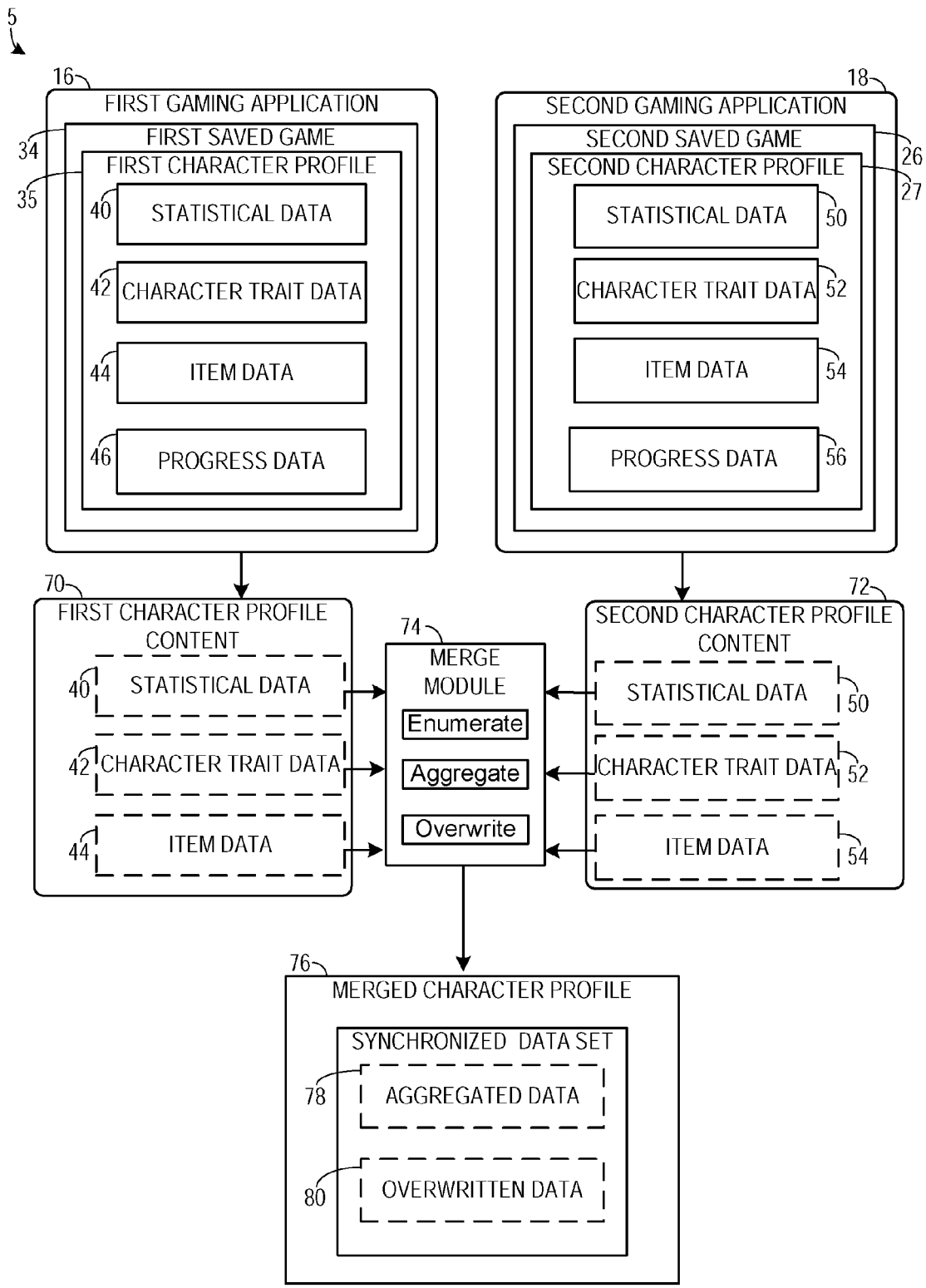
FIG. 3 is a schematic view that illustrates how a first and a second character profile may be merged within the computing system illustrated in FIG. 1.

As shown in FIG. 1, a computing system 5 including a computing device 10 is provided. The computing device 10 may include a processor 12, mass storage 13, and memory 14. The computing device 10 may include or be coupled to an input device 15, such as a gamepad, keyboard, joystick, mouse, etc. A memory device 19 such as a memory card or flash drive may also be coupled to the computing device. A display 17 may also be included in or coupled to the computing device, for displaying the output of the computing device. By way of example, the computing device may be a gaming console, portable gaming device, desktop computer, laptop computer, mobile computing device, etc.

The mass storage 13 may include programs stored thereon, the programs being executable via the processor 12 using portions of memory 14. The programs may include, for example, a first gaming application 16, a second gaming application 18, and a game service 20. These programs may either be stand alone, or may be client-side application program components configured to interoperate with server-side application program components, as discussed below. The game service 20 may include a cross application content library, including application programming interface components that enable the first application to access gaming data saved by the second application, and vice versa, as described below.

In some embodiments, the computing device 10 may be configured to communicate with a game server 22 over a network 24, such as the Internet. The server may be one of a plurality of servers in a server farm, and/or the server may be a virtual machine executed on a plurality of networked machines, for example. The server may be configured to execute server-side components of the first gaming application, second gaming application, and game service. As one example, the game service may be an online multiplayer gaming and digital media delivery service such as XBOX® Live by MICROSOFT® Corporation. In other embodiments, the first gaming application and second gaming application may be web browser-based, such that the client-side application program includes a browser and browser executable code, and the server-side application program includes a browser-based game server.

FIG. 2 schematically illustrates the exchange of gaming data between computing system 5, and shows internal details of the first gaming application 16, second gaming application 18, and game service 20, all of which might reside on either or both of the computing device 10 and the game server 22 as described above.

In one example, the first gaming application 16 may be a wagering game allowing a player to wager currency (e.g. gold) and build a saved game. Alternatively, the first gaming application may be in another genre, such as first person shooting games, real time strategy games, arcade games, squad based games, etc.

Further, in some examples, a duplicate of the first gaming application 18 may also be included in the second gaming application. That is to say, the duplicate of the first gaming application may be a game-within-a-game of the second gaming application. For example, the second gaming application may be a role-playing game in which actions of one or more characters are controlled and the first gaming application may be a wagering game played in a pub within the role playing game world. Thus, one exemplary scenario in the role playing game may include entering a pub and playing the wagering game. However, in another scenario the first gaming application may be played external to and independent of the second gaming application on a separate computing device and/or within a separate executable application.

Continuing with FIG. 2, the first gaming application 18 may also include a first gaming engine 32 which, among other things, may be configured to generate and/or update a first saved game 34 with gaming data. The first saved game 34 may include a first character profile 35 comprising gaming data that is developed through character creation and game play by a user.

The first gaming application 18 may further include a first update module 36 configured to update the first saved game 34. Updating may include merging (e.g. enumerating, reading, writing, overwriting, and/or deleting) external data with gaming data included in the second saved game, as discussed in greater detail herein with regard to FIGS. 3-5.

In some examples, the first gaming application 16 may be digitally distributed via a server over a network. However, in other embodiments, the first gaming application 16 may be purchased on a digital storage device, such as a digital video disk, flash drive, etc.

In one example, the second gaming application 18 may be a role playing game. Alternatively, second gaming application 18 may be of another genre, such as first person shooting games, real time strategy games, arcade games, casino games, squad based games, etc. A second gaming engine 25 may be included in the second gaming application 16. The second gaming engine 25 may be configured to receive user inputs from one or more input devices, as shown in FIG. 1, as well as generate and/or update a second saved game 26 with a second character profile 27 that includes various gaming data, as discussed in greater detail herein with regard to FIG. 3. The gaming data may be generated within a virtual gaming environment via user interaction. For example, a character may accrue points, gold, etc., based on user inputs from a control pad or other suitable input device. The gaming data may also include a free, paid-for, or earned token downloaded from an internet website or received in a presale confirmation from the publisher of a gaming application, for example, which may enable the user to unlock functionality of a gaming application, such as a new level, skill, item, etc. The second saved game 26 may correspond to, or be owned by, a particular player character within the game.

The second gaming application 18 may further include a second update module 28 configured to update the second saved game 26. Updating may include merging (e.g. enumerating, reading, writing, overwriting, and/or deleting) external data from another application with gaming data included in the second saved game, as discussed in greater detail herein with regard to FIGS. 3-5.

Furthermore, in one particular example, a public release of the second gaming application may follow a public release of the first gaming application, allowing a user to build a saved game within the first gaming application before the release of the second gaming application. A user may then choose to merge, via the second and first update modules (28 and 36), at least a portion of the second saved game with at least a portion of the first saved game, 26 and 34 respectively, after the second gaming application 18 is released.

Merging of the saved games may include generating a single aggregated saved game from two or more saved games. In some examples, the aggregated saved game may be used in both the second and first gaming applications. Further in some examples, the aggregated saved games may concurrently updated (e.g. synchronized) in both the second gaming application and the first gaming application. In this way, a plurality of gaming applications can share data, facilitating overlapping or concurrent game-play. Therefore, the virtual gaming world may extend beyond the bounds of a single game.

FIG. 3 illustrates an exemplary depiction of a technique used to merge at least a portion of the saved games (e.g. character profiles) from the first gaming application 16 and the second gaming application 18. As previously discussed, the first and second gaming application may include the first and the second saved game, 34 and 26 respectively. The saved games allow a user to develop a character as well as store progress in a gaming application. The first saved game may include the first character profile 35. The first character profile may include statistical data 40, character trait data 42, item data 44, and progress data 46 for the first gaming application 16. The second character profile 27 may include statistical data 50, character trait data 52, item data 54, and progress data 56 for the second gaming application 18.

Statistical data 40, 50 may include numerical statistics generated through game play, such points scored or currency (e.g., gold, dollars) accumulated in each respective gaming application. Character trait data 42, 52 may include data that indicates the traits that define a character, such as strength, intelligence, dexterity, name, appearance, race, skill level, etc. The item data 44, 54 may include information pertaining to access of various items acquired in the game by the character, such as weapons, potions, spells, armor, concept art, etc. The progress data 46, 56 may include data that indicates a character's progress through the respective first or second gaming application, such as progress level or a location where the game was most recently saved the game, by the user or programmatically.

It will be appreciated that the first and/or second character profiles may include additional data in some embodiments, and that the above listed data types are not exhaustive. Furthermore, it will be appreciated that the values for the statistical data, character trait data, item data, and the progress data included in the first and second character profile may be different. Where data types themselves differ between the character profiles of the first gaming application and the second gaming application, programmatic rules may be applied which specify which differing data types are to be merged according to the techniques described herein. For example, such a rule may specify that values for a "gold" data type from a first gaming application may be merged with the values for a "dollars" data type from a second gaming application, to yield a aggregated currency denominated in "gold".

In response to a character merge request, which may be initiated by a user or the computing system 5, first character profile content 70 and second character profile content 72 may be selected from the first character profile and the second character profile, by choosing at least a portion of the data in each character profile for inclusion as the first and second character profile content to be merged. In the illustrated embodiment, the first character profile content 70 includes statistical data 40, character trait data 42, and item data 44, and the second character profile content 72 may include statistical data 50, character trait data 52, and item data 54. However, it will be appreciated that in other embodiments the first character profile content may include the progress data 46 and the second character profile content may include the progress data 56. In other embodiments, only a subset of one or more of the data types may be selected for merging.

The first character profile content 70 and the second character profile content 72 may be merged by a merge module 74 of the game service 20, illustrated in FIGS. 1 and 2. Returning to FIG. 3, the merge module may in turn include an enumerate function, aggregate function, and overwrite function, which may be used to merge the first and second character profile content, and generate a merged character profile 76 may be in response to the merge request. For example, the merge module may be configured to merge the first character profile with the second character profile by enumerating the content in each character profile, and aggregating or overwriting the enumerated data in the content of the second character profile with the enumerated data in the content from the first character profile. The enumeration identifies a list of the data types and the corresponding values for each data type contained in each profile. Once all data has been enumerated, the aggregate and/or overwrite functions applied to aggregate and/or overwrite the data in the second character profile with data in the first character profile, or vice-versa, based on programmatic rules specified by an application developer. In this way, the merged character profile may include aggregated data 78 and/or overwritten data 80. Once created, the merged character profile 76 may be saved on the computing device 10, on the game server 22, or in both locations, for example, the computing device 10 and the game server 22 illustrated in FIG. 1. The merged character profile may be distributed to the first gaming application 16 and/or the second gaming application 18, after the merged character profile 76 has been generated.

As specific examples of merging operations, merging the character profiles may include enumerating and subsequently aggregating at least a portion of the statistical data 40 with the statistical data 50 which has been enumerated. Further, in some embodiments, the character trait data 42 may be overwritten with the character trait data 52 or visa-versa. Still further in some embodiments, merging may include aggregating the item data 44 and the item data 54. Additionally, merging may include overwriting progress data 46 with progress data 56, when the progress data is included in the character profile content.

By merging in this way, characters from multiple games may be merged, allowing a user to develop characters in a first game, and leverage the characters in a second game. In this way, a user may avoid the frustration associated with abandoning a character to create a new character from scratch, thereby promoting user adoption of new gaming applications.

FIGS. 4-5 illustrate an exemplary depiction of a graphical user interface (GUI) enabling a user to merge character profiles. In particular, FIG. 4 illustrates a window showing the first character profile 35 which is transferred to the second gaming application 18 from the first gaming application 16. The second character profile 27, included in the second gaming application 18, may also be displayed. Additionally, both of the saved games may include gaming data 81, such as points, gold, and items. Each of the categories within the gaming data may have different assigned values based on the user's game-play within the particular gaming application. The gaming data may be included in data categories, such a statistical data and item data. A user may be prompted, via a selector 82 or other suitable user input mechanism, to merge the character profiles.

In response to selection of the selector 82, at least a portion of the data from each particular category may be merged, as shown in FIG. 5, to create the merged character profile 76 in both the second gaming application 18 and the first gaming application 16, enabling a user to generate and save gaming data in multiple gaming applications with the single merged character profile 76.

Merging, in this illustrated embodiment, includes addition of quantities of points, gold, etc., and items that are read in from the first character profile to quantities of points, gold, etc. and items already present in the second character profile. It will be appreciated that merging may also include aggregating additional game data, such as other item data, and/or overwriting game data such as character trait data, as previously discussed. In this way, a user may transfer character profiles from one gaming application to another, expanding the breadth of a virtual gaming world that is accessible to a user's character across multiple gaming environments.

Further in some embodiments, merging the second character profile with the first character profile multiple times may be inhibited if performed in excess of a predetermined threshold, thereby preventing gamers from undeservingly increasing various statistics (e.g. gold, points, etc.) in their character profile. It will be appreciated that the embodiment depicted in FIGS. 4 and 5 is exemplary in nature and additional or alternate techniques may be used to facilitate data transfer between two or more gaming applications.

Figure 6:
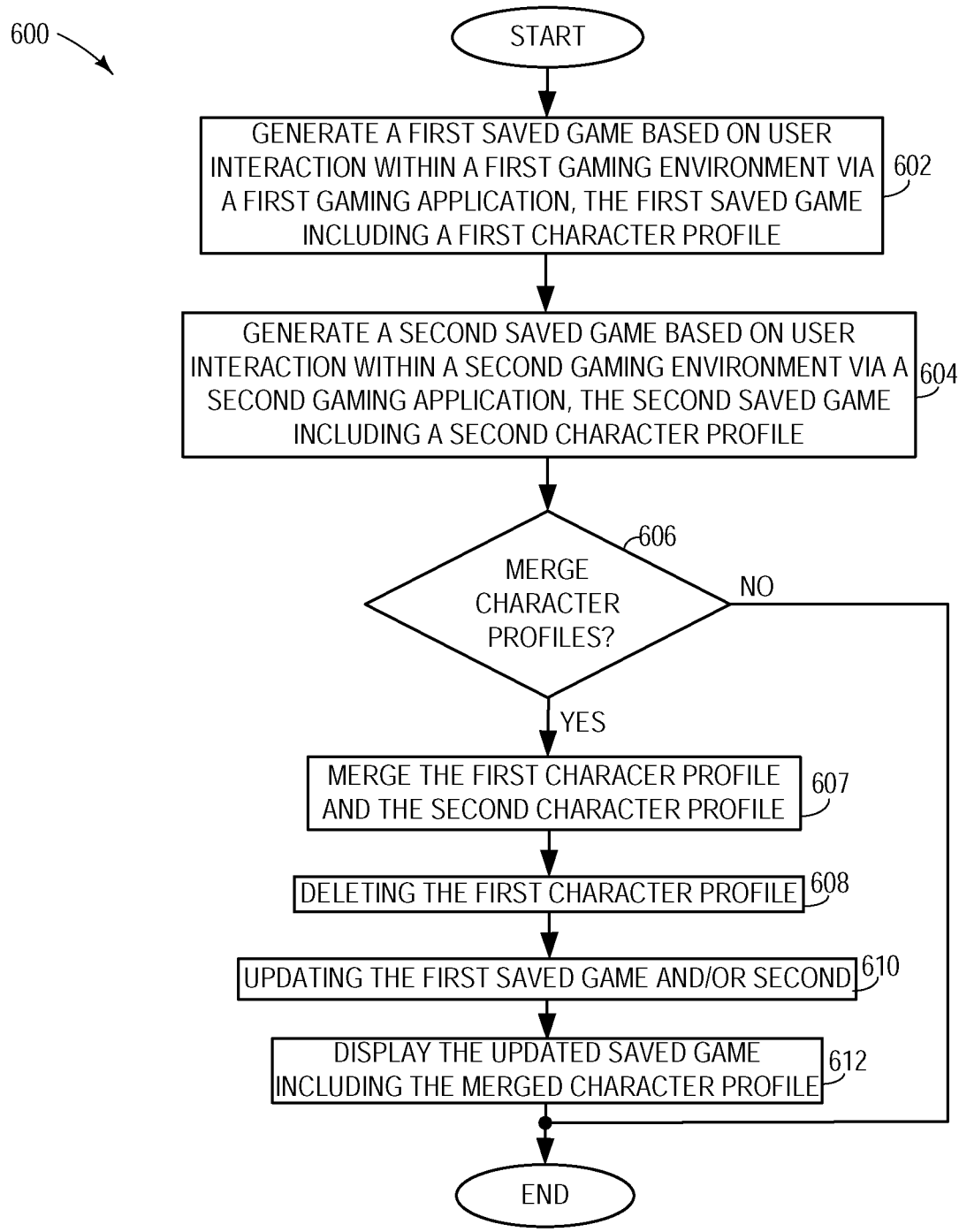
FIG. 6 shows a process flow depicting a method for merging gaming data between two or more gaming applications.

FIG. 6 illustrates a method 600 for managing gaming data across two or more gaming applications. The method 600 may be implemented using the hardware and software components of the systems and devices described above, but alternatively may be implemented using other suitable hardware and software components.

At 602, the method 600 includes generating a first saved game based on user interaction within a first gaming environment via a first gaming application, the first saved game including a first character profile.

Next, at 604, the method includes generating a second saved game based on user interaction within a second gaming environment via a second gaming application, the second saved game including a second character profile.

Next, at 606, it is determined whether the character profiles (i.e. the first character profile and the second character profile) are to be merged. A determination may be made to merge the profiles, for example, in response to receiving a user command via a graphical user interface to merge the character profiles, and verifying that the merge command may be performed for the requested profiles. If it is determined that the character profiles will not be merged, the method 600 ends.

However, if it is determined that the character profiles will be merged the method includes, at 607, merging the first character profile with the second character profile. In some embodiments the method may include, at 608, deleting the first character profile. However, in other embodiments, merging the first character profile with the second character profile for a second time, or other predetermined number of times, may be inhibited. In this way, a user may be inhibited from repeatedly merging character profiles and generating a large amount of undeserved currency, points, etc.

Next, at 610, the method may include, in some embodiments, updating the first and/or second saved game. Updating the first and/or second saved game may include transferring the merged character profile to the first and/or second gaming application. Further, in some examples, updating the first and/or second saved game may include deleting the first and/or second character profile. Thus, the first and/or second character profile may be overwritten with the merged character profile in the first and/or second gaming application. In this way, the merged character profile may be accessed in one or both of the first and second gaming applications. Further, in some embodiments, the method may include displaying the updated saved game including the merged character profile via the first and/or second gaming application, at 612.

In this manner, the above described method 600 allows a merged character profile to be generated, which can enable a user to leverage labor and effort spent developing a character profile in a first gaming application, by transferring aspects of the character's profile to a second gaming application, thereby enabling the user to build on earlier time and effort.

Figure 7:
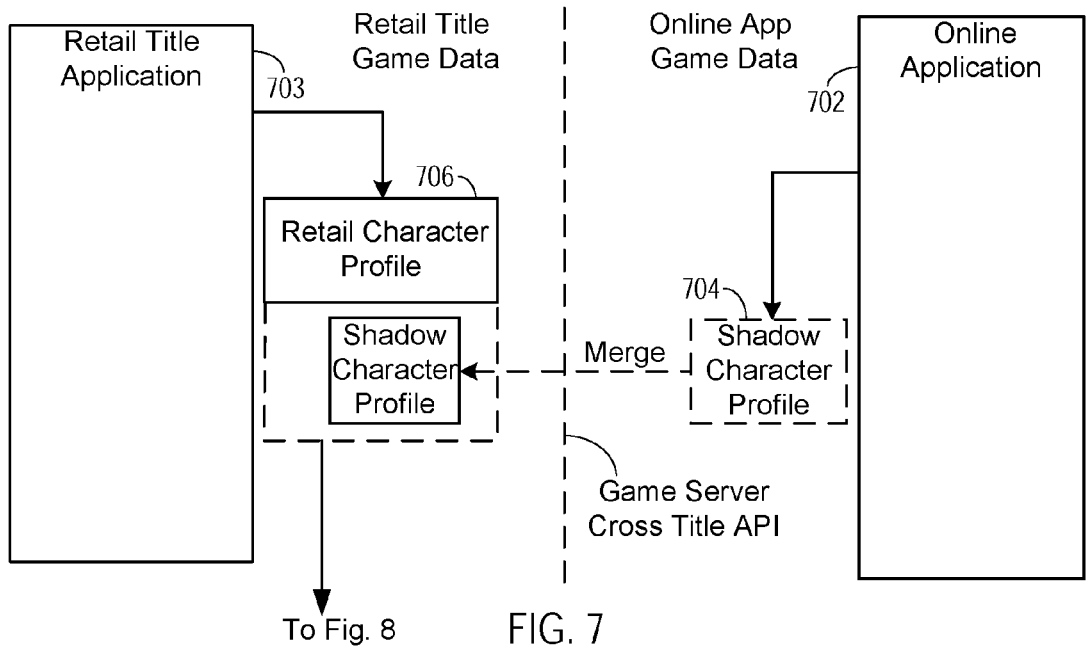
FIGS. 7-8 show an exemplary use case scenario of the computing system of FIG. 1 and method of FIG. 6.
Figure 8:
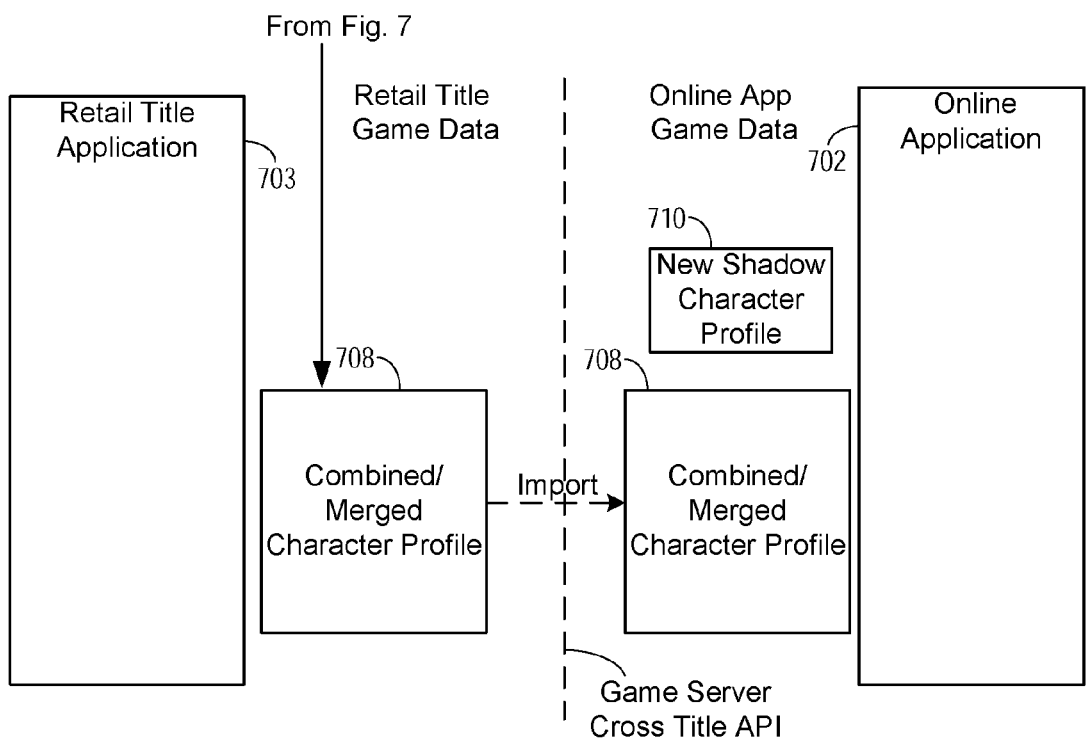

FIGS. 7-8 illustrate an exemplary use case scenario for the above described systems and methods. In this use case scenario an online application 702 is released for download and/or play via a game server before a retail title application 703, which is typically released on optical media such as CDROM or DVDROM as well as for download via an online retail store of a game service. Thus, a user may generate gaming data within the online application 702 prior to playing the retail title application 703. Further, in this use case scenario a user may generate a shadow character profile 704 by creating and playing "shadow" characters in the online application. For example, the shadow character profile 704 may include one or more of the following gaming data categories.

Shadow Character Data:
    Shadow Character Name
    Gold (Bankroll)
    Debt
    Points (Gold Wagered for online application Unlock)
    1-5 Star Wagering MiniGame 1 Skill Level
    1-5 Star Wagering MiniGame 2 Skill Level
    1-5 Star Wagering MiniGame 3 Skill Level
    15 Unique Items/State
      a. Items locked
      b. Items Won
      c. Items Won but sold/used in retail The shadow character profile 704 may have pre-defined values, which are programmatically determined by the online application, rather than being user specified. For example the shadow character names may be pre-defined. In other examples, the user may be able to specify various parameters such as shadow character name.

Once the retail title is released a player may purchase the retail title, create a retail game character, and through game play generate a retail game character profile 706. The retail game character profile 706 may include one or more of the following content categories.

Retail Game Character Data:
    Retail Character Name (Post retail title application release)
    Retail Character Sex (M/F)
    Gold (Bankroll)
    Debt (Effects gold and also triggers crime states in retail title application)
    Points
    1-5 Wagering MiniGame 1 Skill Level
    1-5 Wagering MiniGame 2 Skill Level
    1-5 Wagering MiniGame 3 Skill Level
    15 Unique Items/State
      Items locked
      Items Won
      Items Won but sold/used in retail It will be appreciated that the retail game character profile 706 may include other content categories, in addition to those listed above.

To transfer gold, skills, and other items, for example, from the online game to retail title application, a user may choose to merge the retail character with the shadow character. Merging may include enumerating, reading, writing, overwriting, and/or deleting shared content. The shared character data may include one or more of the following content categories, for example.

Shared Character Data:
    Online Application Shadow Character Name
    Retail Character Name (Post retail title application release)
    Retail Character Sex (M/F)
    Gold (Bankroll)
    Debt (Effects gold and also triggers crime states in retail title application)
    Points (Gold Wagered for XBLA Unlock)
    1-5 Wagering MiniGame 1 Skill Level
    1-5 Wagering MiniGame 2 Skill Level
    1-5 Wagering MiniGame 3 Skill Level
    15 Unique Items/State
      Items locked
      Items Won
      Items Won but sold/used in retail In response to merging, a new combined/merged character profile 708 is generated, as illustrated in FIG. 8. The combined/merged character profile 708 may also be imported into the online application. The shadow character profile 704 may be erased or overwritten with a new shadow character profile 710, preventing a user from merging the shadow character profile 704 more than once and unfairly boosting the user's saved game content. Further, in some cases, the new shadow character profile 710 may include one or more empty content categories.

It will be appreciated that the above described scenario may be used to release an online gaming application prior to the retail title release of a gaming application, to enable gamers to begin to develop characters, with their attendant skills, gold, items, etc., which may be utilized within the retail title application once it is released. In this way, anticipation and excitement for the release of the retail title may be increased in a manner that is enjoyable to gamers, potentially increasing both user satisfaction and game sales. Additional, it will be appreciated that the first gaming application and second gaming application may each be retail title applications, such that the gaming data is transferable between the retail title applications.

It will be understood that the term "computing device" as used herein may refer to any suitable type of computing device configured to execute programs. Such computing device may include, but are not limited to, a mainframe computer, personal computer, laptop computer, portable data assistant (PDA), computer-enabled wireless telephone, networked computing device, combinations of two or more thereof, etc. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that a computer-readable storage medium may be provided having program instructions stored thereon, which upon execution by a computing device, cause the computing device to execute the methods described above and cause operation of the systems described above.

Furthermore, the specific routines or methods described herein may represent one or more of any number of processing strategies such as event-driven, interrupt-driven, multitasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for managing gaming data, the system comprising at least one computing device coupled to a gaming service, the computing device being configured to execute:
a first gaming engine configured to generate a first character profile based on a user's interaction within a first gaming environment included in a first gaming application;
a second gaming engine configured to generate a second character profile based on the user's interaction within a second gaming environment included in a second gaming application, the first character profile different from the second character profile; and
an update module configured to merge the first character profile with the second character profile after generation of the first and second character profiles and generate a single new merged character profile, the single new merged character profile including content from the first and second character profiles, wherein the content includes statistical data, character trait data, and item data from the first and second character profiles;
wherein the merging the first character profile with the second character profile includes aggregating data from the first character profile with data from the second character profile and reading shared data in the first character profile and the second character profile, and writing the shared data into the single new merged character profile based on programmatic rules, the shared data in the single new merged character profile including one or more of statistical data, character trait data, and item data read in the first and second character profiles.

2. The system of claim 1, wherein the content includes progress data from the first and second character profiles.

3. The system of claim 2, wherein the update module is further configured to merge the first character profile with the second character profile by enumerating the content in each character profile, and aggregating or overwriting the enumerated data in the content of the second character profile with the enumerated data in the content from the first character profile, to create the single new merged character profile.

4. The system of claim 3, wherein statistical data includes currency and/or points and is merged by aggregating statistical data from each of the first and second character profiles.

5. The system of claim 3, wherein character trait data includes name, appearance, and skill level and is merged by overwriting character trait data from each of the first and second character profiles to create the single new merged character profile.

6. The system of claim 3, wherein the item data includes information pertaining to access of items acquired by a character, and is merged by aggregating item data from each of the first and second character profiles, the items including at least one of weapons, potions, spells, armor, and concept art.

7. The system of claim 3, wherein progress data includes a progress level or a location where the game was saved, and is merged by overwriting progress data in the second character profile with progress data from the first character profile to create the single new merged character profile.

8. The system of claim 1, wherein at least a portion of one or more of the first gaming application and the second gaming application are executed on the gaming service.

9. The system of claim 1, wherein the first gaming environment is a wagering game allowing a player to wager currency and build a saved game, and the second gaming environment is a role-playing game in which actions of one or more characters are controlled.

10. A method for managing gaming data within a computing device having a processor and memory including code stored thereon executable by the processor, the method comprising:
generating a first character profile based on user interaction within a first gaming environment implemented via a first gaming application;
generating a second character profile based on user interaction within a second gaming environment implemented via a second gaming application, the second gaming application different from the first gaming application, the first character profile different from the second character profile; and
merging the first character profile with the second character profile after generation of the first and second character profiles to create a single new merged character profile executable within the first and second gaming applications, the single new merged character profile including content including statistical data, character trait data, and item data content categories from the first and second character profiles;
wherein merging the first character profile with the second character profile includes aggregating data from the first character profile with data from the second character profile and reading shared data in the first character profile and the second character profile, and writing the shared data into the single new merged character profile based on programmatic rules, the shared data including one or more of statistical data, character trait data, and item data read in the first and second character profiles.

11. The method of claim 10, wherein the content includes progress data from the first and second character profiles.

12. The method of claim 11, wherein merging the first character profile with the second character profile includes enumerating the content in each character profile, and aggregating or overwriting the enumerated data in the content of the second character profile with the enumerated data in the content from the first character profile to create the single new merged character profile.

13. The method of claim 12, wherein statistical data includes currency and/or points and is merged by aggregating statistical data from each of the first and second character profiles.

14. The method of claim 12, wherein character trait data includes name, appearance, and skill level and is merged by writing character trait data from at least one of the first and second character profiles in the single new merged character profile.

15. The method of claim 12, wherein the item data includes information pertaining to access of items acquired by a character, and is merged by aggregating item data from each of the first and second character profiles, the items including at least one of weapons, potions, spells, armor, and concept art.

16. The method of claim 12, wherein progress data includes a progress level or a location where the game was saved, and is merged by overwriting progress data in the second character profile with progress data from the first character profile to create the single new merged character profile.

17. The method of claim 10, further comprising transferring the single new merged character profile to the second gaming application.

18. The method of claim 10, further comprising overwriting the first character profile with the single new merged character profile in the first gaming application.

19. A method for managing gaming data within a computing device having a processor and memory including code stored thereon executable by the processor, the method comprising:

generating a first character profile based on user interaction within a first gaming environment implemented via a first gaming application;

generating a second character profile based on user interaction within a second gaming environment implemented via a second gaming application, the second gaming application different from the first gaming application, the first character profile different from the second character profile;

merging the first character profile with the second character profile after generation of the first and second character profiles to create a single new merged character profile executable within the first and second gaming applications, the single new merged character profile including content including statistical data, character trait data, and item data content categories from the first and second character profiles; and overwriting the first character profile with the single new merged character profile in the first gaming application;

wherein merging the first character profile with the second character profile includes aggregating data from the first character profile with data from the second character profile and reading shared data in the first character profile and the second character profile, and writing the shared data into the single new merged character profile based on programmatic rules, the shared data including one or more of statistical data, character trait data, and item data read in the first and second character profiles.

20. The method of claim 19, further comprising transferring the single new merged character profile to the second gaming application.

* * * * *